(12) United States Patent
Tseng et al.

(10) Patent No.: US 11,236,871 B2
(45) Date of Patent: Feb. 1, 2022

(54) POWER GENERATING DEVICE AND A SHOE WITH THE SAME

(71) Applicants: Shen-Ko Tseng, Taipei (TW); Juinne-Ching Liao, New Taipei (TW)

(72) Inventors: Shen-Ko Tseng, Taipei (TW); Juinne-Ching Liao, New Taipei (TW)

(73) Assignee: Shen-Ko Tseng, Taipei (TW)

( * ) Notice: Subject to any disclaimer, the term of this patent is extended or adjusted under 35 U.S.C. 154(b) by 38 days.

(21) Appl. No.: 15/852,663

(22) Filed: Dec. 22, 2017

(65) Prior Publication Data

US 2018/0180228 A1 Jun. 28, 2018

(30) Foreign Application Priority Data

Dec. 23, 2016 (CN) .......................... 201611205437.4

(51) Int. Cl.
| | | |
|---|---|---|
| *F21L 4/08* | (2006.01) | |
| *H02K 35/06* | (2006.01) | |
| *H02K 7/18* | (2006.01) | |
| *A43B 3/00* | (2006.01) | |
| *F21Y 115/10* | (2016.01) | |

(52) U.S. Cl.
CPC .............. *F21L 4/08* (2013.01); *A43B 3/0015* (2013.01); *H02K 7/1892* (2013.01); *H02K 35/06* (2013.01); *A43B 3/001* (2013.01); *F21Y 2115/10* (2016.08)

(58) Field of Classification Search
CPC ......... F21L 4/08; H02K 35/06; H02K 7/1892; A43B 3/001; A43B 3/0015; F21Y 2115/10

USPC ...... 310/12.12, 15, 23, 25, 30, 339; 362/183
See application file for complete search history.

(56) References Cited

U.S. PATENT DOCUMENTS

| | | | | |
|---|---|---|---|---|
| 4,453,098 | A * | 6/1984 | Nikitin ................... | H02K 5/225 310/71 |
| 8,468,722 | B2* | 6/2013 | Battlogg .............. | A43B 5/0405 36/117.1 |
| 2012/0056563 | A1* | 3/2012 | Tseng ..................... | H02K 35/02 315/363 |
| 2013/0005408 | A1* | 1/2013 | Matsui ................... | H01Q 1/248 455/573 |
| 2013/0188341 | A1* | 7/2013 | Tseng ..................... | H02K 35/04 362/183 |
| 2014/0246861 | A1* | 9/2014 | Jeon ........................ | H02K 53/00 290/54 |
| 2015/0077053 | A1* | 3/2015 | Stamenic .............. | H01F 27/365 320/109 |

(Continued)

FOREIGN PATENT DOCUMENTS

| | | |
|---|---|---|
| CN | 201957858 U | 9/2011 |
| CN | 105591515 A | 5/2016 |

*Primary Examiner* — Alex W Mok

(57) ABSTRACT

A power generating device comprises a magnetic core, an induction coil assembly, a first housing, a conductive plate, and a second housing. The induction coil assembly is coupled with the magnetic core, and the magnetic core and the induction assembly are configured in the accommodating space of the first housing. The conductive plate is attracted to the magnetic core. The second housing is configured above the conductive plate. When the second housing receives an external force along an extending direction of the magnetic core, a distance change between the conductive plate and the magnetic core causes a variation of magnetic flux. The induction coil assembly generates a current by sensing the magnetic flux variation.

13 Claims, 9 Drawing Sheets

(56) References Cited

U.S. PATENT DOCUMENTS

2015/0318776 A1* 11/2015 Tseng ................ H05B 33/0806
310/15

* cited by examiner

POWER GENERATING DEVICE AND A SHOE WITH THE SAME

CROSS-REFERENCE TO RELATED APPLICATIONS

This application claims the priority benefit of Chinese Application Serial No. 201611205437.4 filed Dec. 23, 2016 the disclosure of which is incorporated herein by reference.

FIELD OF THE INVENTION

The present invention relates to a power generating device and a shoe with the same, more particularly, to a power generating device generating power by using the electromagnetic induction and a shoe with the same.

BACKGROUND

In order to be in line with the trend of the environmental protection and energy saving in the world, many practical and energy saving products show up in the market. Among them, the product able to generate power by simple actions of people could not only achieve the effect of energy saving, but also please people in use. For example, the flashlight generating power by pressing and the bicycle converting mechanical energy into electrical energy both are the goods that are practical and can generate power.

On the other hand, when pedestrians walk in the faint light of the night is prone to traffic accidents. Therefore, pedestrians often need to wear reflecting accessories or glowing accessories to increase the recognition at night. Since the glowing accessories need to be carried with people, the accessories are usually equipped with thin batteries. However, the thin battery containing mercury is prone to cause environmental pollution. Besides, the battery is easy to leak, moisture or damage if the accessories do not have a well waterproof equipment.

In summary, a good glowing accessory should be generated power by simple actions of people, and the internal structure should be simple without the necessary of high-standard waterproof equipments. A good glowing accessory is equipped without the mercury battery with high level of pollution, and pedestrians can wear the glowing accessory in a variety of weather to improve the traffic safety. Therefore, the mentioned accessories have a high degree of practicality and become an active topic for various manufacturers.

SUMMARY OF THE INVENTION

An object of the present invention is to provide a power generating device configured in a wearable object. The power generating device generates power by simple actions. The invention does not need to be equipped with the battery which may cause environmental pollution and the electric power generated by the device can activate the LED to flash such that it will be helpful to improve pedestrian traffic safety.

According to an embodiment of the present invention, the power generating device of the present invention comprises a magnetic core, an induction coil assembly, a first housing, a conductive plate, and a second housing. The induction coil assembly is coupled to the magnetic core. The first housing has an accommodating space for accommodating the magnetic core and the induction coil assembly. The conductive plate is configured under the magnetic core. The second housing is configured above the conductive plate.

Wherein when the second housing receives an external force along an extending direction of the magnetic core, the conductive plate is away from the magnetic core, and when the external force is absent, the conductive plate is attracted to the magnetic.

In another embodiment, when the second housing receives the external force, the relative position between the induction coil assembly and the magnetic core is fixed.

In another embodiment, when the conductive plate is away from the magnetic core, the distance between the conductive plate and the magnetic core is between 1 mm and 3 mm, the instantaneous maximum voltage generated by the conductive plate is less than 15V.

Wherein, the induction coil assembly comprises 1000-4000 turns of coil.

In another embodiment, the power generating device has a column appearance, and a diameter of the column is between 3 cm and 4 cm, and a height of the column is between 0.2 cm and 1 cm.

According to another embodiment of the present invention, the power generating device of the present invention comprises a force receiver, a conductive plate, a magnetic core, and an induction coil assembly. The conductive plate is configured under the force receiver. The magnetic core has an extending direction. The induction coil assembly is coupled to the magnetic core.

Wherein, the magnetic core is between the force receiver and the conductive plate. When the force receiver receives an external force along the extending direction of the magnetic core, a relative motion is generated between the conductive plate and the magnetic core.

According to another embodiment, when the force receiver receives the external force, the induction coil assembly and the magnetic core are fixed.

According to another embodiment, when the force receiver receives an external force along the extending direction of the magnetic core, the magnetic core is fixed and the conductive plate is away from the magnetic core.

According to another embodiment, the distance of the relative motion between the conductive plate and the magnetic core is in the range of 1 mm and 3 mm, and the instantaneous maximum voltage generated by the relative motion between the conductive plate and the magnetic core is less than 15V.

According to another embodiment, the power generating device further comprises a power storage device to be charged during the relative motion.

According to another embodiment, a shoe with a power generating device of the present invention comprises a vamp, a sole, and a plurality of glowing units. The sole is coupled to the vamp, and the power generating device is configured in the sole. The plurality of glowing units is coupled to the power generating device. Wherein, the power generating device comprises a force receiver, a conductive plate, a magnetic core, and an induction coil assembly. The conductive plate is under the force receiver. The magnetic core has an extending direction. The induction coil assembly is coupled to the magnetic core.

Wherein, the magnetic core is between the force receiver and the conductive plate. When the force receiver receives an external force along the extending direction of the magnetic core, the conductive plate generates a first relative motion corresponding to the magnetic core. Moreover, when the external force is absent, the conductive plate generates a second relative motion corresponding to the magnetic core.

According to another embodiment, when the force receiver receives the external force, the relative position between the induction coil assembly and the magnetic core is fixed.

According to another embodiment, the distance of the first relative motion is between 1 mm and 3 mm. The maximum voltage generated by the first relative motion is between 5V and 15V.

According to another embodiment, the power generating device further comprises a power storage device to be charged during the first or the second relative motion.

According to another embodiment, the plurality of glowing units comprises a first LED and a second LED and the polarity of the first and second LEDs are reversed coupled, wherein the first LED glows during the first relative motion, and the second LED glows during the second relative motion.

According to another embodiment, the power generating device of the present invention comprises a second housing, a conductive plate, a magnetic core, an induction coil assembly, and a power storage device. The conductive plate is configured under the second housing. The magnetic core has an extending direction. The induction coil assembly is coupled to the magnetic core.

Wherein, the magnetic core is between the second housing and the conductive plate. When the second housing receives an external force along an extending direction of the magnetic core, the conductive plate generates a first relative motion corresponding to the magnetic core. When the external force is absent, the conductive plate generates a second relative motion corresponding to the magnetic core, so that the power storage device is charged.

According to another embodiment of the present invention, a shoe of the present invention comprises a power generating device, a sole, and a first plurality of LED. The power generating device is disposed in the sole. The first plurality of LEDs is coupled to the power generating device. The power generating device comprises a force receiver, a conductive plate, a magnetic core, and an induction coil assembly. The conductive plate is configured under the force receiver. The magnetic core has an extending direction. The induction coil assembly is coupled to the magnetic core. Wherein, when the force receiver receives an external force along the extending direction of the magnetic core, a relative motion is generated between the conductive plate and the magnetic core so that the first plurality of LEDs glow.

According to another embodiment, the relative position between the induction coil assembly and the magnetic core is fixed.

According to another embodiment, the shoe further comprises a power storage device to be charged by the power generating device and a second plurality LEDs coupled to the power storage device, wherein when the power storage device stores a power greater than a preset value, the power storage device drives the second plurality of LEDs to glow.

According to another embodiment, the shoe further comprises a controller and a third plurality of LEDs. When the power storage device stores a power greater than a preset value, the power storage device drives the controller to control the third plurality of LEDs to glow.

In summary, the power generating device of the present invention generates the induced current by the relative motion of the conductive plate and the magnetic core. At the same time, the relative motion of the induction coil assembly and the magnetic core is less than the relative motion of the conductive plate and the magnetic core. The power generating device of the present invention can be configured in the object such as the sole or the mat. The external force applied to the sole or the mat by walking can generate the power to be stored, or provide the power to the power consumption device to work such as LED light. In other words, when other suitable power consumption devices are integrated into the power generating device of the present invention, the power generating device can be a green product without external power or battery. Besides, the power generating device of the present invention can be set in the shoes easily and generate the power when the user is walking. More specifically, the power generating device of the present invention is applied to a light glowing module to increase the recognition possibility of the user at night and to improve the user's traffic safety.

BRIEF DESCRIPTION OF THE APPENDED DRAWINGS

Some of the embodiments will be described in detail, with reference to the following figures, wherein like designations denote like members, wherein.

The advantages, spirits, and features of the present invention will be explained and discussed with embodiments and figures as follows.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications could be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
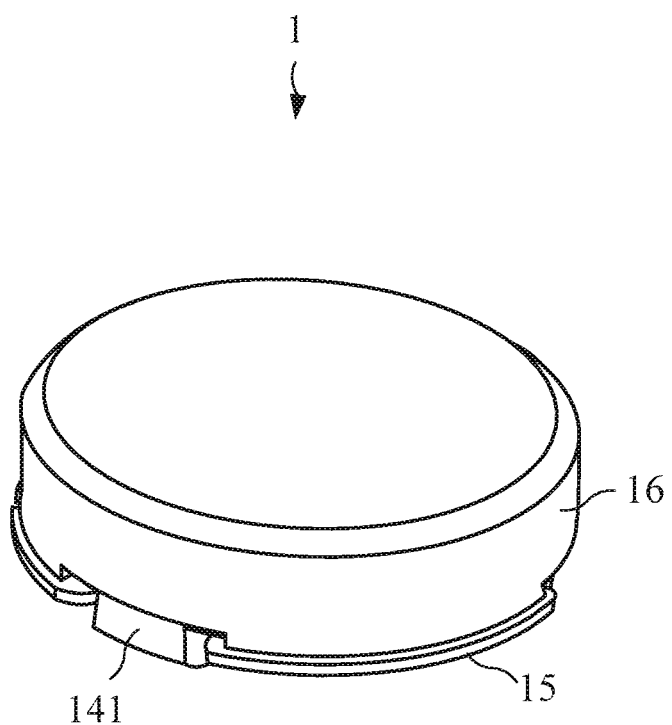
FIG. 1 shows a schematic diagram of an embodiment of the power generating device of the present invention.
Figure 2:
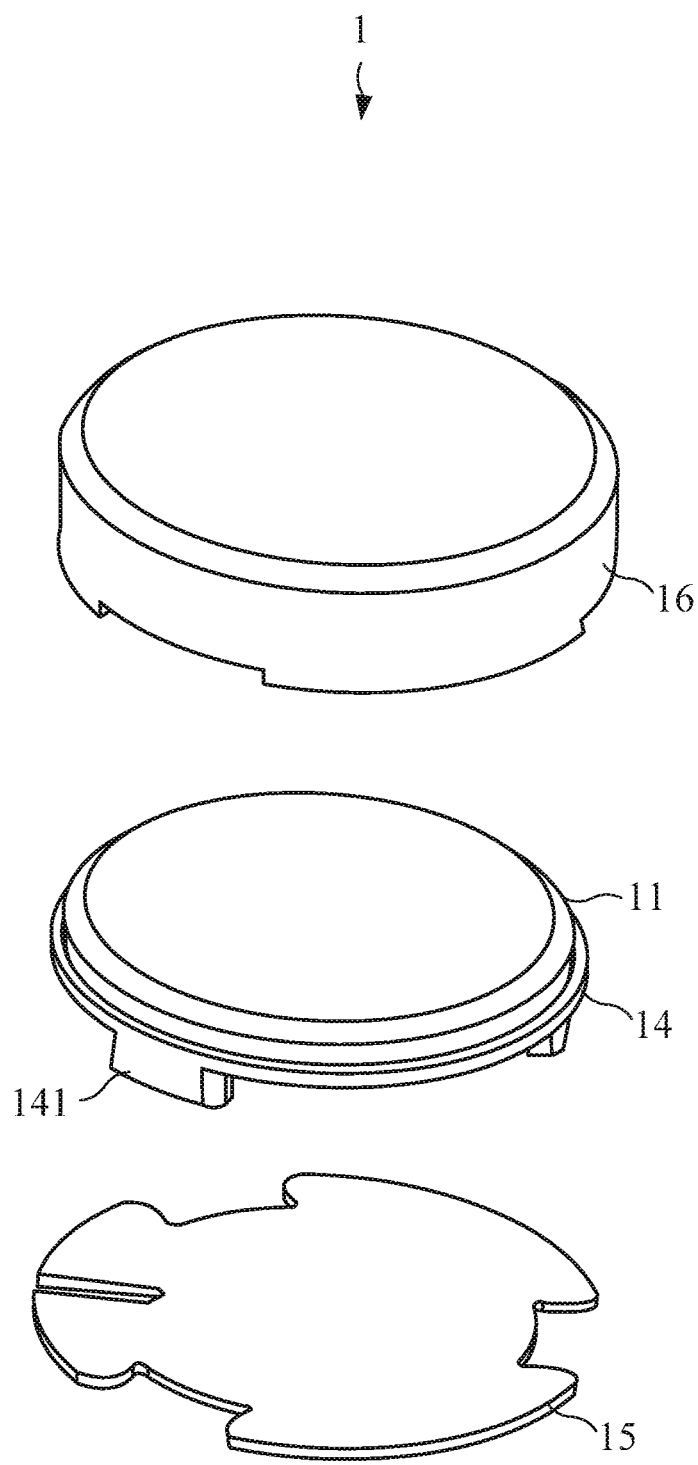
FIG. 2 shows a partial explosion diagram of the power generating device of FIG. 1.
Figure 3:
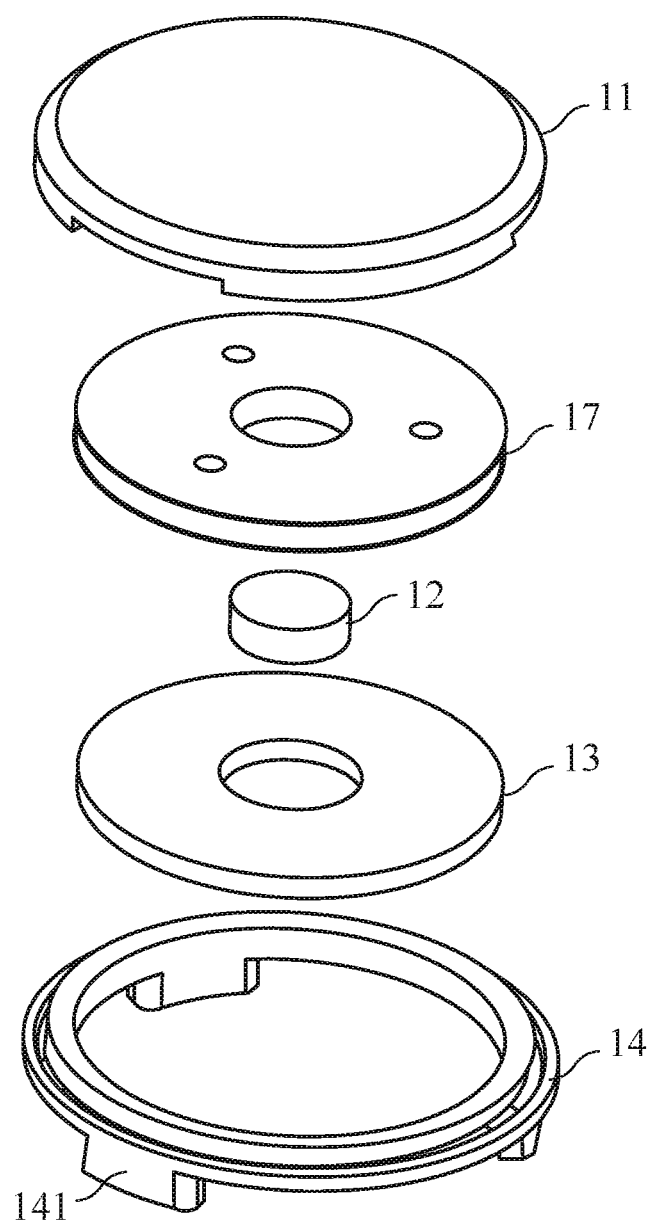
FIG. 3 shows an explosion diagram of the power generating device of FIG. 1 without the conductive plate and the second housing.

Please refer to FIG. 1 to FIG. 3. FIG. 1 shows a schematic diagram of an embodiment of the power generating device 1 of the present invention. FIG. 2 shows a partial explosion diagram of the power generating device 1 of FIG. 1. FIG. 3 shows an explosion diagram of the power generating device 1 of FIG. 1 without the conductive plate 15 and the second housing 16. According to an embodiment of the present invention, the power generating device 1 comprises a magnetic core 12, an induction coil assembly 13, a first housing 11, a conductive plate 15, and a second housing 16. The induction coil assembly 13 is coupled to the magnetic core 12. The first housing 11 has an accommodating space for accommodating the magnetic core 12 and the induction coil assembly 13. The conductive plate 15 is configured under the magnetic core 12. The second housing 16 is configured above the conductive plate 15 as shown in FIG. 1 to FIG. 3.

Wherein when the second housing 16 receives an external force along an extending direction of the magnetic core 12, the second housing 16 can directly or indirectly make the conductive plate 15 be away from the magnetic core 12. The induction coil assembly 13 senses a magnetic flux variation and generates an induced current. When the external force is absent, the conductive plate 15 is attracted to the magnetic 12 and back to the original position.

It should be noted that the "accommodating" described in the present invention does not mean that it must be completely covered. The word "couple" described in the present invention may be a direct or indirect connection. "The induction coil assembly 13 is coupled to the magnetic core 12" can be meant for the magnetic core 12 configured outside and the induction coil assembly 13 configured inside, or the magnetic core 12 configured inside and the induction coil assembly 13 configured outside.

In an embodiment, the relative position between the induction coil assembly 13 and the magnetic core 12 may shift slightly because the second housing 16 receives the external force. In another embodiment, the relative position between the induction coil assembly 13 and the magnetic core 12 is fixed and therefore, the relative position will not change whether or not the second housing 16 receives the external force.

Please refer to FIG. 3 again. The induction coil assembly 13 surrounds the magnetic core 12 in this schematic. The present invention is not limited thereto. The magnetic core 12 may surround the induction coil assembly 13, or the magnetic core 12 and the induction coil assembly 13 can be combined in another manner.

Please refer to FIG. 2 and FIG. 3 again. The power generating device 1 of the present invention further comprises a bracing ring 14 coupled to the first housing 11. The bracing ring 14 is configured to the periphery of the first housing 11, such as the edge of the opening thereof. The bracing ring 14 has a bracing leg 141. The conductive plate 15 could be attracted by the magnetic core 12. In another embodiment, the conductive plate 15 has a reserved hole, slot, or unfilled space to accommodate the bracing leg 141.

Next, the second housing 16 may be configured to cover the first housing 11. Since the first housing 11 is braced by the bracing ring 14 or exposed partly, the first housing 11 may accommodate the magnetic core 12 and the induction coil assembly 13 incompletely or completely. In another embodiment, the second housing 16 may cover the first housing 11 incompletely.

Besides, the first housing 11 may comprise a magnetic material to fix the magnetic core 12 in an embodiment. For example, the first housing 11 can be a magnetic iron cover, or a non-magnetic material (e.g., a plastic cover) with magnetic material partly to attract the magnetic core 12. In an embodiment, the first housing 11 could be a non-magnetic material such as plastic or rubber. The first housing 11 is coupled to the magnetic core 12 and the induction coil assembly 13 by the internal fixing element.

In another embodiment, while the second housing 16 receives an external force along an extending direction of the magnetic core 12, the second housing 16 presses the bracing ring 14 to make the conductive plate 15 away from the magnetic core 12. It is meant that the second housing 16 presses the conductive plate 15 indirectly. Then the induction coil assembly 13 senses a magnetic flux variation and generates an induced current. When the external force is absent, the conductive plate 15 is attracted to the magnetic 12 and back to the original position. In another embodiment, while the second housing 16 receives an external force along an extending direction of the magnetic core 12, the second housing 16 directly presses the conductive plate 15 away from the magnetic core 12. Then the induction coil assembly 13 senses a magnetic flux variation and generates an induced current. When the external force is absent, the conductive plate 15 is attracted to the magnetic 12 and back to the original position.

In practice, the power generating device 1 of the present invention can be configured in a wearable object such as the shoes. When wearing the shoes to walk, the user steps on the shoes to apply the external force in the vertical direction to the power generating device 1 directly or indirectly. In an embodiment, when the power generating device 1 receives the external force, the second housing 16 configured above or on the first housing 11 generates a relative motion to the first housing 11. At the same time, the conductive plate 15 also generates a relative motion to the magnetic core 12, for example, the conductive plate 15 is away from the magnetic core 12, so that the induction coil assembly 13 senses a magnetic flux variation and generates an induced current. When the external force is absent (for example, the user does not tread on the shoes or the shoes are away from the ground), the magnetic core 12 exerts the magnetic attraction or the magnetic restoring force to the conductive plate 15. The conductive plate 15 approaches or adsorbs to the magnetic core 12 by the magnetic attraction or the magnetic restoring force.

In an embodiment, the power generating device 1 of the present invention further comprises a coil fixing element 17 fixed in the first housing 11. The induction coil assembly 13 is fixed to the coil fixing element 17.

Furthermore, the induction coil assembly 13 can comprise 1000-5000 turns per induction coil assembly, such as 2000-4000 turns per induction coil assembly. Besides, the diameter of the induction coil may be 0.1-0.2 millimeter. In an embodiment, the induction coil assembly 13 may change the number of induction coil turns or the size according to the required power, the accommodating space size, and the material.

Figure 4:
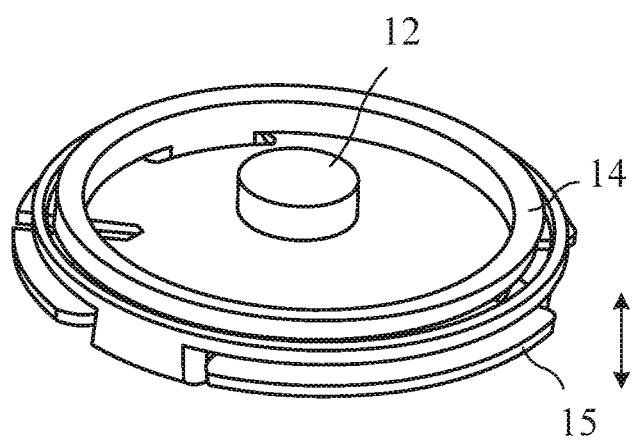
FIG. 4 shows a schematic diagram of moving direction of the conductive plate of the power generating device of FIG. 1.

Please refer to FIG. 4. FIG. 4 shows a schematic diagram of moving direction of the conductive plate 15 of the power generating device 1 of FIG. 1. Wherein the distance of back and forth motion of the conductive plate 15 corresponding to the magnetic core 12 is between 1 mm and 6 mm. For example, the distance of back and forth motion of the conductive plate 15 corresponding to the magnetic core 12 is between 1 mm and 3 mm. Therefore, the user will feel comfortable when stepping on.

In one embodiment, the distance between the conductive plate 15 and the magnetic core 12 is between 1 mm and 6 mm. For example, the distance between the conductive plate 15 and the magnetic core 12 is between 1 mm and 3 mm, such as 2 mm.

In addition, the instantaneous maximum voltage generated by motion of the conductive plate 15 is less than 15V. For example, the induced voltage is between 2V to 15V, such as 3V, 5V or 10V, and it is enough to activate couples of LEDs. The induced voltage and the induced current generated by the power generating device 1 of the present invention can drive a power receiving element such as a buzzer, a lighting device, a battery, etc.

The above-mentioned power receiving element can be a light-emitting diode (LED) coupled to the wearable object. The light-emitting diode is electrically connected to the induction coil assembly 13, so that the induced voltage generated by the induction coil assembly 13 can activate the light-emitting diode for flashing.

In one embodiment, the power generating device 1 is in the form of a cylinder having a diameter, but not limited to, between 2 to 3 cm or 3 to 4 cm. The height of the cylinder is, but not limited to, between 0.2 to 1.5 cm, such as 0.3 to 1 cm. In an embodiment, the shape and size of one or more elements may be scaled depending on the circumstances.

According to an embodiment of the present invention, the power generating device 1 of the present invention comprises a second housing 16, a conductive plate 15, a magnetic core 12, and an induction coil assembly 13. The conductive plate 15 is configured under the second housing 16. The magnetic core 12 has an extending direction. The induction coil assembly 13 is coupled to the magnetic core 12.

Wherein, the magnetic core 12 is between the second housing 16 and the conductive plate 15. When the second housing 16 receives an external force along an extending direction of the magnetic core 12, the conductive plate 15 generates a relative motion corresponding to the magnetic core, such as away from the magnetic core 12. When the external force is absent, the conductive plate 15 generates another relative motion corresponding to the magnetic core 12, such as being attracted to the magnetic core 12 or being adsorbed to the magnetic core 12.

In an embodiment, the relative position between the induction coil assembly 13 and the magnetic core 12 fixed by a fixing element is fixed. Therefore, the relative position will not change whether the second housing 16 receives the external force or not. In an embodiment, the conductive plate 15 can be connected or coupled to the second housing 16 when the second housing 16 does not receive the external force. In another embodiment, the conductive plate 15 may not be connected or coupled to the second housing 16, but the gap between the conductive plate 15 and the second housing 16 is less than 1 mm, such as 0.1 mm or less than 0.1 mm. The power generating device 1 can comprise a coupling element configured between the conductive plate 15 and the second housing 16. When the second housing 16 receives the external force, the coupling element drives the conductive plate 15. Therefore, a relative motion is generated between the conductive plate 15 and the magnetic core 12.

Further, in another embodiment, the distance between the conductive plate 15 and the magnetic core 12 is in the range of 1 mm and 3 mm. The induced voltage generated by the conductive plate 15 and the magnetic core 12 is less than 15V, such as between 5V and 15V, or between 9V and 15V. Therefore, multiple series of LED elements can be driven, such as 2 to 3 or 3 to 6. Besides, the induced voltage generated by the relative motion of the conductive plate 15 and the magnetic core 12 is a positive voltage for a period of time and then a negative voltage for another time. Therefore, the LED elements can be composed of two LED chips in reverse polarity. When the positive voltage is generated, one of the chips emits; when the negative voltage is generated, another chip emits.

The power generating device 1 of the present invention can be configured in the mat or below the mat. The power generation device 1 receives a vertical force by the movement of the weight, the animal or the people over the power generating device 1. Thereby the conductive plate 15 and the induction coil assembly 13 are driven to generate the relative motion. Therefore, the induction coil assembly 13 generates current by sensing the magnetic flux variation.

The induction coil assembly 13 can be winded around the coil fixing element 17 when the power generating device 1 of the present invention is being composed. The number of coil turns can be increasing or decreasing and the coil material may be selected as needed. Next, the first housing 11, the coil fixing element 17 and the magnetic core 12 are combined and configured on the bracing ring 14. After that, the conductive plate 15 is configured below the bracing ring 14, and the bracing leg 141 penetrates the reserved hole of the conductive plate 15. Finally, the second housing 16 covers the conductive plate 15 to complete the power generating device 1 of the present invention.

In terms of the electrical output of the present invention, the design of the present invention can produce an induced voltage close to a pulse or a triangular wave shape when receiving the external force. The peak is between about 2V to 15V, such as 5V to 15V. The pulse width is about one millisecond (ms) to eight milliseconds (ms).

In another embodiment, a power generating device 1 of the present invention comprises a force receiver, a conductive plate 15, a magnetic core 12, and an induction coil assembly 13. The conductive plate 15 is configured under the force receiver. The magnetic core 12 has an extending direction. The induction coil assembly 13 is coupled to the magnetic core 12. Wherein, when the force receiver receives an external force along the extending direction of the magnetic core 12, a relative motion is generated between the conductive plate 15 and the magnetic core 12.

In another embodiment, when the force receiver receives the external force, the induction coil assembly 13 and the magnetic core 12 are fixed.

In another embodiment, when the force receiver receives an external force along the extending direction of the magnetic core 12, the magnetic core 12 is fixed and the conductive plate 15 is away from the magnetic core 12.

In another embodiment, the power generating device 1 further comprises a power storage device (not shown) to be charged during the relative motion.

Figure 5:
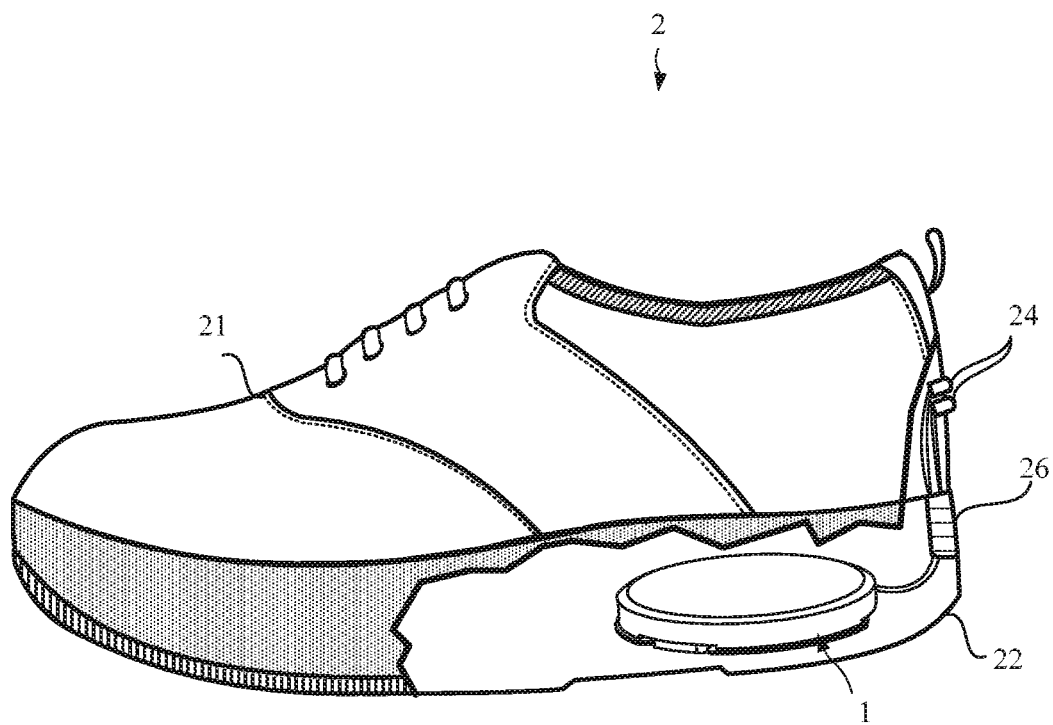
FIG. 5 shows a schematic diagram of an embodiment of the shoe with the power generating device of the present invention.

Please refer to FIG. 5 and FIG. 1 to FIG. 4 above. FIG. 5 shows a schematic diagram of an embodiment of the shoe 2 with the power generating device 1 of the present invention. As shown in FIG. 5, a shoe 2 comprises a vamp 21, a sole 22 coupled to the vamp 21, and the power generating device 1 configured in the sole 22. The power generating device 1 comprises a force receiver, a conductive plate 15, a magnetic core 12, and an induction coil assembly 13. The conductive plate 15 is configured below the force receiver. The magnetic core 12 has an extending direction. The induction coil assembly 13 is coupled to the magnetic core 12. In an embodiment, the mentioned force receiver is the second housing 16.

Wherein, the magnetic core 12 is configured between the force receiver and the conductive plate 15. When the force receiver receives an external force along an extending direction of the magnetic core 12, the conductive plate 15 generates a first relative motion corresponding to the magnetic core, such as away from the magnetic core 12. The induction coil assembly 13 generates a current by sensing a magnetic flux variation. When the external force is absent, the conductive plate 15 generates a second relative motion corresponding to the magnetic core 12, such as adsorption and return to the original location. At the meanwhile, the induced current with another direction is generated, too.

Therefore, the user with the shoes 2 can generate a relative movement between the magnetic core 12 and the conductive plate 15 in the power generating device 1 by stepping the sole 22 of the shoes 2, so that the induced current is generated.

According to an embodiment, when the force receiver receives the external force, the relative position between the induction coil assembly 13 and the magnetic core 12 is fixed.

According to another embodiment, the distance of the first relative motion or the second relative motion between the conductive plate 15 and the magnetic core 12 is in the range of 1 mm and 3 mm. The maximum voltage generated by the motion of the conductive plate 15 corresponding to the magnetic core 12 is between 5V and 15V.

The shoe 2 further comprises a plurality of glowing units 24 configured in the vamp or the sole, and the glowing units 24 is coupled to the power generating device 1. In an embodiment, a first glowing unit 24 comprises two reversed polarity chips, a first LED and a second LED respectably. When the conductive plate 15 generates the first relative motion corresponding to the magnetic core 12, the first LED emits. When the conductive plate 15 generates the second relative motion corresponding to the magnetic core 12, the second LED emits. At the same time, the conversion unit 26 can be configured between the power generating device 1 and the glowing units 24. The electric power generated by the power generating device 1 can be converted into the power specification for the glowing units 24 by the conversion unit 26.

In practice, the shoe 2 can further comprise a memory module, or the memory module can be coupled to the shoe 2. The memory module is coupled to the glowing units 24 or the conversion unit 26 to preset or regulate the glowing frequency, number of times, and brightness of the glowing units 24.

Besides, the shoe 2 can further comprise a switch for passing the generated induced current into the glowing units 24 only when emitting is required. Further, the shoe 2 may comprise a battery. The battery stores the power generated by the power generating device 1 and not being used in the glowing units 24, so that the user can use the power afterward.

Figure 6:
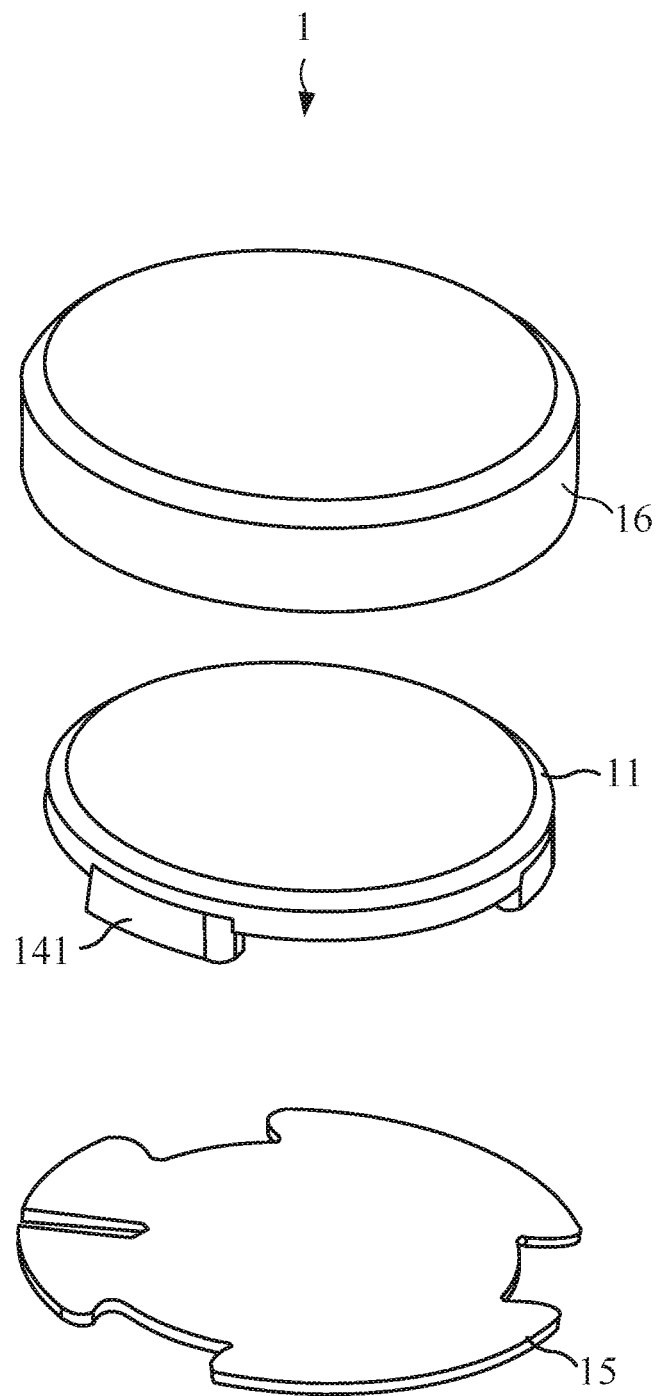
FIG. 6 shows another explosion diagram of an embodiment of the power generating device of the present invention.
Figure 7:
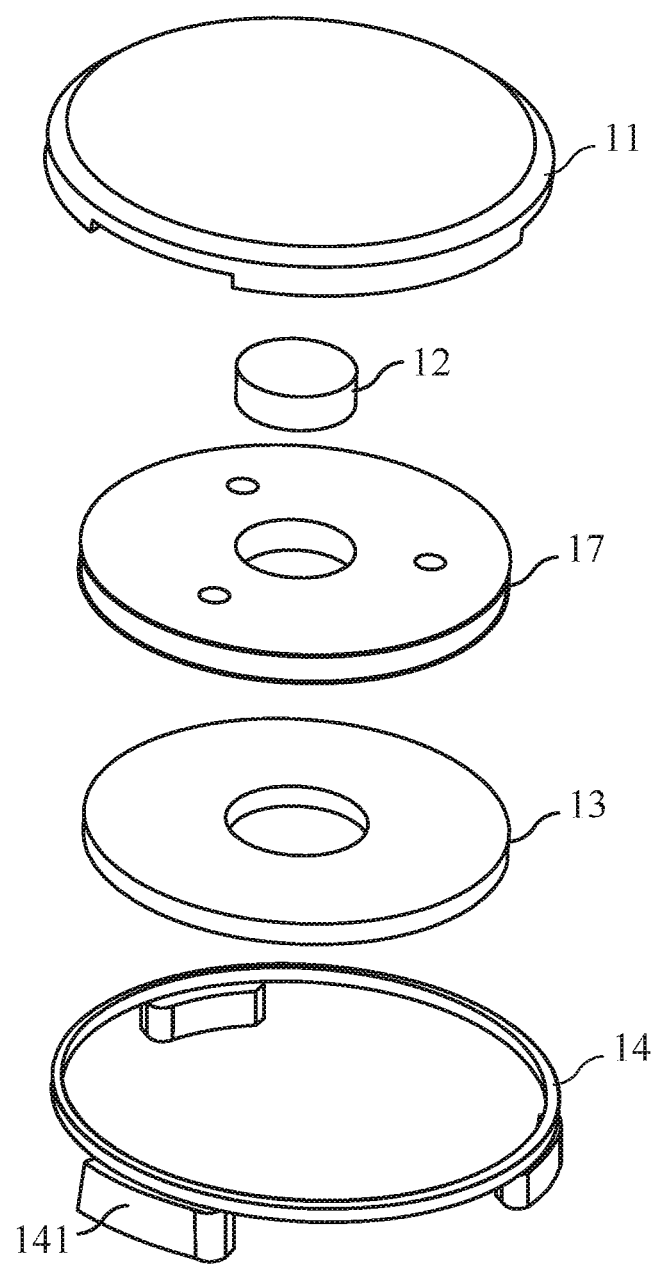
FIG. 7 shows an explosion diagram of the power generating device of FIG. 6 without the conductive plate and the second housing.

Please refer to FIG. 6 and FIG. 7. FIG. 6 shows another explosion diagram of an embodiment of the power generating device 1 of the present invention. FIG. 7 shows an explosion diagram of the power generating device 1 of FIG. 6 without the conductive plate 15 and the force receiver. According to another embodiment of the present invention, the power generating device 1 comprises a force receiver, a conductive plate 15, a magnetic core 12, an induction coil assembly 13, and a power storage device (not shown). The conductive plate 15 configured below the force receiver. The magnetic core 12 has an extending direction. The induction coil assembly 13 is coupled to the magnetic core 12. The power storage device may be a rechargeable battery or a capacitor. The power storage device is charged during the first or the second relative motion.

Wherein, the magnetic core 12 is between the force receiver and the conductive plate 15. When the force receiver receives an external force along an extending direction of the magnetic core 12, the conductive plate 15 generates a first relative motion corresponding to the magnetic core 12. When the external force is absent, the conductive plate 15 generates a second relative motion corresponding to the magnetic core 12, so that the power storage device is charged. The force receiver is a force receiver. The shape of the force receiver is not limited, just when the force receiver receives an external force along an extending direction of the magnetic core, the first relative motion of the conductive plate 15 corresponding to the core 12 can be generated. The force receiver may be composed of a ring, a sheet, a thimble, or a component having the function of zoom distance or zoom intensity. The force receiver can be connected, crossed, or clamped to the conductive plate 15. In an embodiment, the mentioned force receiver is the second housing 16.

In an embodiment, the first housing 11 covers the bracing ring 14. The bracing leg 141 of the bracing ring 14 is located on the edge of the first housing 11 opening. The outer side surface shape of the bracing leg 141 is the same as the outer diameter curvature of the first housing 11, and the bracing leg 141 and the first housing 11 are at the same side. When the combination of the first housing 11 and the bracing ring 14 is viewed from the side, the side surface of the first housing 11 and the outer side surface of the bracing leg 141 may be regarded as continuous and same planes without protrusion. Therefore, when the force receiver generates a relative motion corresponding to the magnetic core 12, the inner surface of the force receiver will not rub on the first housing 11 or the bracing ring 14 due to the protrusion.

Figure 8:
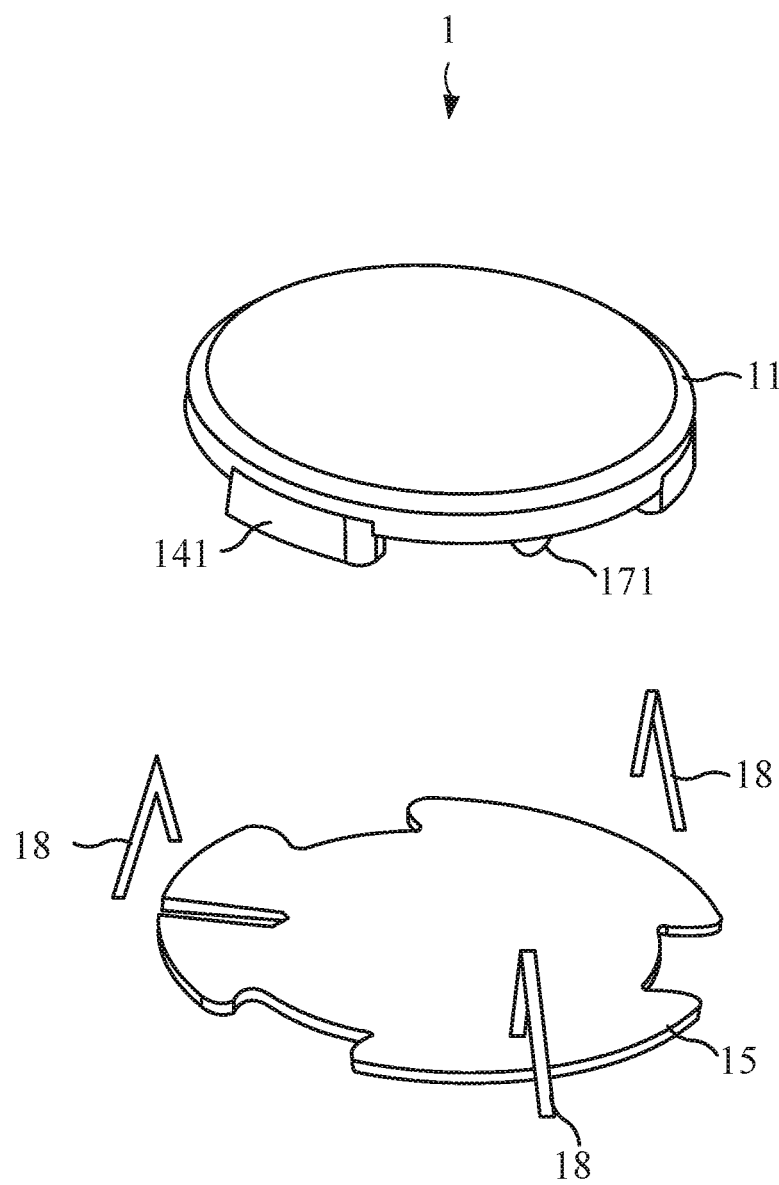
FIG. 8 shows another explosion diagram of an embodiment of the power generating device of the present invention.
Figure 9:
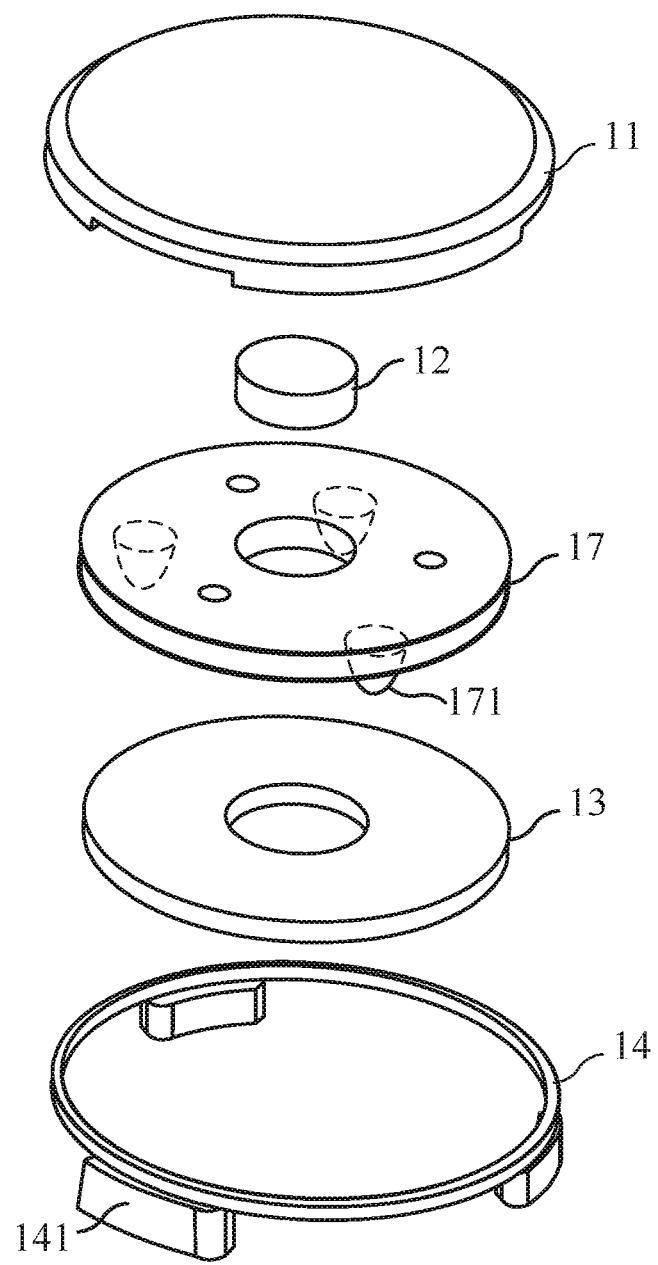
FIG. 9 shows an explosion diagram of the power generating device of FIG. 8 without the conductive plate and the force receiver.

Please refer to FIG. 8 and FIG. 9. FIG. 8 shows another explosion diagram of an embodiment of the power generating device 1 of the present invention. FIG. 9 shows an explosion diagram of the power generating device 1 of FIG. 8 without the conductive plate 15 and the force receiver. In another embodiment, the force receiver may comprise a plurality of inverted V-type components 18 spread evenly around the conductive plate 15. One end of every V-type components 18 is configured on the conductive plate 15, and the other end is located outside the conductive plate 15. When the peak of the V-type components 18 receives an external force along an extending direction of the magnetic core 12, the conductive plate 15 end of the inverted V-type components 18 drives the conductive plate 15 to generate the first relative motion away from the magnetic core 12. When the external force is absent, the conductive plate 15 is attracted to original position.

The force receiver may not cover the magnetic core 12 to make the volume requirement of the power generating device 1 much more flat. The conductive plate 15 may generate greater magnetic flux change at the same height requirement through driving by the force receiver having increasing receive distance.

Please refer to FIG. 8 and FIG. 9 again. In an embodiment, the induction coil assembly 13 is configured on the coil fixing element 17. At the same time, the outer surface of the conductive plate 15 further comprises a compressible cushioning material 171. The coil fixing element 17 is located near the cushioning material 171. Therefore, when the conductive plate 15 generates the second relative motion corresponding to the magnetic core 12, for example, the conductive plate 15 is attracted to original position, the conductive plate 15 will not cause noise or damage to the other components due to excessive movement distance or speed. After the cushioning material 171 being compressed, the conductive plate 15 is just back to the original position.

The conductive plate 15 slows down and limits the position by the compression of the cushioning material 171.

According to another embodiment of the present invention, a shoe 2 with a power generating device 1 of the present invention comprises a vamp 21, a sole 22, a first glowing unit, and a power storage device. The sole 22 is coupled to the vamp 21, and the power generating device 1 is configured in the sole 22. The first glowing unit is configured in the vamp 21 or the sole 22, and the first glowing unit is coupled to the power generating device 1. The power storage device is coupled to the power generating device 1. The power generating device 1 comprises a second housing 16, a conductive plate 15, a magnetic core 12, and an induction coil assembly 13. The conductive plate 15 is configured under the second housing 16. The magnetic core 12 has an extending direction. The induction coil assembly 13 is coupled to the magnetic core 12.

According to another embodiment, a shoe 2 with a power generating device 1 further comprises a second glowing unit configured in the vamp 21 or the sole 22. When the power storage device stores a power greater than a preset value, the power storage device drives the second glowing unit to glow. Therefore, whether the amount of electricity power in the storage device has reached the required value or not can be confirm due to the glowing signal of the second glowing unit. Further, the power storage device is configured on the shoe 2 in a replaceable manner. When the second glowing unit generates a glowing signal, the power storage device with a certain amount of power can be replaced with another power storage device to be charged. Therefore, the power storage device with a certain amount of power can be used as power supply for other electrical products.

According to another embodiment of the present invention, a shoe 2 with a power generating device 1 of the present invention comprises a sole 22 and a first plurality of LEDs. The power generating device 1 is configured in the sole 22. The first plurality of LEDs is coupled to the power generating device 1. The power generating device 1 comprises a force receiver, a conductive plate 15, a magnetic core 12, and an induction coil assembly 13. The conductive plate 15 is configured under the force receiver. The magnetic core 12 has an extending direction. The induction coil assembly 13 is coupled to the magnetic core 12.

In an embodiment, the mentioned force receiver is the second housing 16.

In an embodiment, the relative position between the induction coil assembly 13 and the magnetic core 12 is fixed.

Wherein, the magnetic core 12 is located between the force receiver and the conductive plate 15. When the force receiver receives an external force along an extending direction of the magnetic core 12, the conductive plate 15 generates a first relative motion corresponding to the magnetic core 12. Moreover, when the external force is absent, the conductive plate 15 generates a second relative motion corresponding to the magnetic core 12. Therefore, the first plurality of LEDs glows, and the power generating device 1 charges the power storage device.

Therefore, the user with the shoes 2 can generate a relative movement between the magnetic core 12 and the conductive plate 15 in the power generating device 1 by stepping the sole 22 of the shoes 2, so that the induced current is generated. At the same time, through being coupled to the power generating device 1, the power storage device stores the induced current generated by the power generating device 1 and not being used in the first plurality of LEDs.

According to another embodiment, a power storage device is coupled to the power generating device 1. The power storage device is used to be charged by the power generating device 1.

According to another embodiment, a shoe 2 with a power generating device 1 further comprises a second plurality of LEDs configured in a vamp 21 or the sole 22. When the power storage device stores a power greater than a preset value, the power storage device drives the second plurality of LEDs to glow. Therefore, whether the amount of electricity power in the storage device has reached the required value or not can be confirm due to the glowing signal of the second plurality of LEDs. Further, the power storage device is configured on the shoe 2 in a replaceable manner. In another embodiment, when the second plurality of LEDs generates a glowing signal, the power storage device with a certain amount of power can be replaced with another power storage device to be charged. Therefore, the power storage device with a certain amount of power can be used as power supply for other electrical products.

According to another embodiment, a shoe 2 further comprises a controller and a third plurality of LEDs. When the power stored in the power storage device is greater than a preset value, the power storage device drives the controller to control the third plurality of LEDs to glow. Wherein, the controller may be an integrated circuit driven by sufficient current or voltage. The controller sends power controlling signal to the third plurality of LEDs to glow, so that the third plurality of LEDs can generate glowing effect. In an embodiment, the third plurality of LEDs is a glowing matrix. When the power stored in the power storage device is greater than a preset value to drive the controller, the third plurality of LEDs may show the English alphabet from A to Z in order. In another embodiment, the third plurality of LEDs is a glowing unit with many glowing colors. When the power stored in the power storage device is greater than a preset value to drive the controller, the third plurality of LEDs may show the color effect like red, orange, yellow, green, blue, indigo, and purple respectably according to the power controlling signal. In another embodiment, the third plurality of LEDs is a glowing unit with many glowing intensity. When the power stored in the power storage device is greater than a preset value to drive the controller, the third plurality of LEDs may show the rhythmic glowing effect of continuous and different glowing intensities.

In summary, the power generating device of the present invention generates the induced current by the relative motion of the conductive plate and the magnetic core. At the same time, the relative motion of the induction coil assembly and the magnetic core is less than the relative motion of the conductive plate and the magnetic core. The power generating device of the present invention can be configured in the object such as the sole or the mat. The external force applied to the sole or the mat by walking can generate the power to be stored, or provide the power to the power consumption device to work such as LED light. In other words, when other suitable power consumption devices are integrated into the power generating device of the present invention, the power generating device can be a green product without external power or battery. Besides, the power generating device of the present invention can be set in the shoes easily and generate power when the user is walking. More specifically, the power generating device of the present invention is applied to a light glowing module to increase the recognition possibility of the user at night thereby improving the user's traffic safety.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A power generating device comprising:
   a magnetic core;
      a first housing having an accommodating space, for accommodating the magnetic core and the induction coil assembly;
      a bracing ring configured to the periphery of the first housing, the bracing ring comprising at least one bracing leg;
      a conductive plate configured under the magnetic core and detachably attracted toward the magnetic core, the conductive plate having at least one reserved hole, slot or unfilled space to accommodate the at least one bracing leg, the conductive plate being capable of moving relatively to the magnetic core to generate a magnetic flux variation;
      an induction coil assembly coupled to the magnetic core and configured to generate an induced current according to the magnetic flux variation; and
      a second housing configured above the conductive plate;
      wherein when the second housing receives an external force along an extending direction of the magnetic core, the second housing makes the conductive plate to be away and vertically spaced apart from the magnetic core, and when the external force is absent, the conductive plate is attracted toward the magnetic core.

2. The power generating device of claim 1, wherein when the second housing receives the external force, the relative position between the induction coil assembly and the magnetic core is fixed.

3. The power generating device of claim 1, wherein when the conductive plate is away and vertically spaced apart from the magnetic core, the distance between the conductive plate and the magnetic core is in the range of 1 mm and 3 mm.

4. The power generating device of claim 3, wherein when the conductive plate is away and vertically spaced apart from the magnetic core, the instantaneous maximum voltage generated by the conductive plate is less than 15V.

5. The power generating device of claim 1, wherein the power generating device has a column appearance, and a diameter of the column is between 3 cm and 4 cm, and a height of the column is between 0.2 cm and 1 cm.

6. The power generating device of claim 1, wherein the induction coil assembly comprises 1000-4000 turns of coil.

7. A power generating device comprising:
   a force receiver;
      a conductive plate configured under the force receiver, the conductive plate having at least one reserved hole, slot or unfilled space;
      a bracing ring configured between the force receiver and the conductive plate, the bracing ring comprising at least one bracing leg to be accommodated in the least one reserved hole, slot or unfilled space of the conductive plate;
      a magnetic core having an extending direction; and
      an induction coil assembly coupled to the magnetic core;
      wherein the conductive plate is detachably attracted toward the magnetic core, when the force receiver receives an external force along the extending direction of the magnetic core, the force receiver makes the conductive plate to be away and vertically spaced apart from the magnetic core and a relative motion is generated between the conductive plate and the magnetic core to generate a magnetic flux variation, and the induction coil assembly senses the magnetic flux variation to generate an induced current.

8. The power generating device of claim 7, wherein when the force receiver receives the external force, the induction coil assembly and the magnetic core are fixed.

9. The power generating device of claim 7, wherein when the force receiver receives an external force along the extending direction of the magnetic core, the magnetic core is fixed and the conductive plate is away and vertically spaced apart from the magnetic core.

10. The power generating device of claim 7, wherein the distance of the relative motion between the conductive plate and the magnetic core is in the range of 1 mm and 3 mm, and the instantaneous maximum voltage generated by the relative motion between the conductive plate and the magnetic core is less than 15V.

11. The power generating device of claim 7, further comprising a power storage device to be charged during the relative motion.

12. The power generating device of claim 7, wherein when the force receiver receives the external force, the force receiver directly presses the conductive plate to make the conductive plate to be away and vertically spaced apart from the magnetic core.

13. The power generating device of claim 7, wherein when the force receiver receives the external force, the force receiver presses the bracing ring to make the conductive plate to be away and vertically spaced apart from the magnetic core.

* * * * *